US006296287B1

United States Patent
Kinbara et al.

(10) Patent No.: US 6,296,287 B1
(45) Date of Patent: Oct. 2, 2001

(54) CURVED ELONGATE MEMBER OF CLOSED SECTIONAL SHAPE AND METHOD AND APPARATUS FOR FABRICATING THE SAME

(75) Inventors: Kiichi Kinbara, Wako; Hiroyoshi Kato; Iwao Nakata, both of Osaka; Yoshiaki Imagawa, Ogaki, all of (JP)

(73) Assignees: Honda Giken Kogyo Kubushiki Kaisha, Tokyo; Nakata Mfg. Co., Ltd, Osaka; Marujun Co., Ltd, Gifu Pref, all of (JP)

( * ) Notice: Subject to any disclaimer, the term of this patent is extended or adjusted under 35 U.S.C. 154(b) by 0 days.

(21) Appl. No.: 09/527,482

(22) Filed: Mar. 16, 2000

(30) Foreign Application Priority Data

Mar. 16, 1999 (JP) .................................. 11-070876

(51) Int. Cl.⁷ ............................... E04C 2/30; E04C 2/38; B60R 19/02
(52) U.S. Cl. ..................... 293/120; 293/122; 52/731.3; 52/732.2; 52/735.1
(58) Field of Search ..................... 293/102, 120, 293/121, 122; 52/732.2, 732.1, 735.1, 737.6, 731.2, 731.3, 792.1; 29/509, 514, 521, 505; 403/274, 278, 279, 282

(56) References Cited

U.S. PATENT DOCUMENTS

| | | | |
|---|---|---|---|
| 674,379 | * | 5/1901 | Hard .................................... 52/732.1 |
| 1,898,229 | * | 2/1933 | Veale .................................... 293/120 |
| 3,332,197 | * | 7/1967 | Hinkle ................................. 52/731.3 |
| 3,834,103 | * | 9/1974 | Knohl .................................... 52/364 |
| 4,408,790 | * | 10/1983 | Shimoda et al. ...................... 293/122 |
| 4,580,380 | * | 4/1986 | Ballard ................................ 52/309.9 |
| 5,483,782 | * | 1/1996 | Hall .................................... 52/730.1 |
| 5,514,432 | * | 5/1996 | Lisec .................................... 428/35.8 |
| 5,791,115 | * | 8/1998 | Nicolai et al. ...................... 52/730.4 |

FOREIGN PATENT DOCUMENTS 09141329    11/1995   (JP) .

* cited by examiner

*Primary Examiner*—Stephen T. Gordon
*Assistant Examiner*—G. Blankenship
(74) *Attorney, Agent, or Firm*—Merchant & Gould P.C.

(57) ABSTRACT

Hollow closed-sectional elongate member is provided by bending a plastic strip widthwise. The closed-sectional elongate member has a crimped joint section provided on any one of its walls. The crimped joint section is formed by crimping together opposite longitudinal edge portions of the strip as the strip is bent widthwise. The crimped joint section extends along the length of the closed-sectional elongate member and thus functions as a rib reinforcing the rigidity of the elongate member. The closed-sectional elongate member is also curved along its longitudinal direction, to provide a closed-sectional curved elongate member.

4 Claims, 16 Drawing Sheets

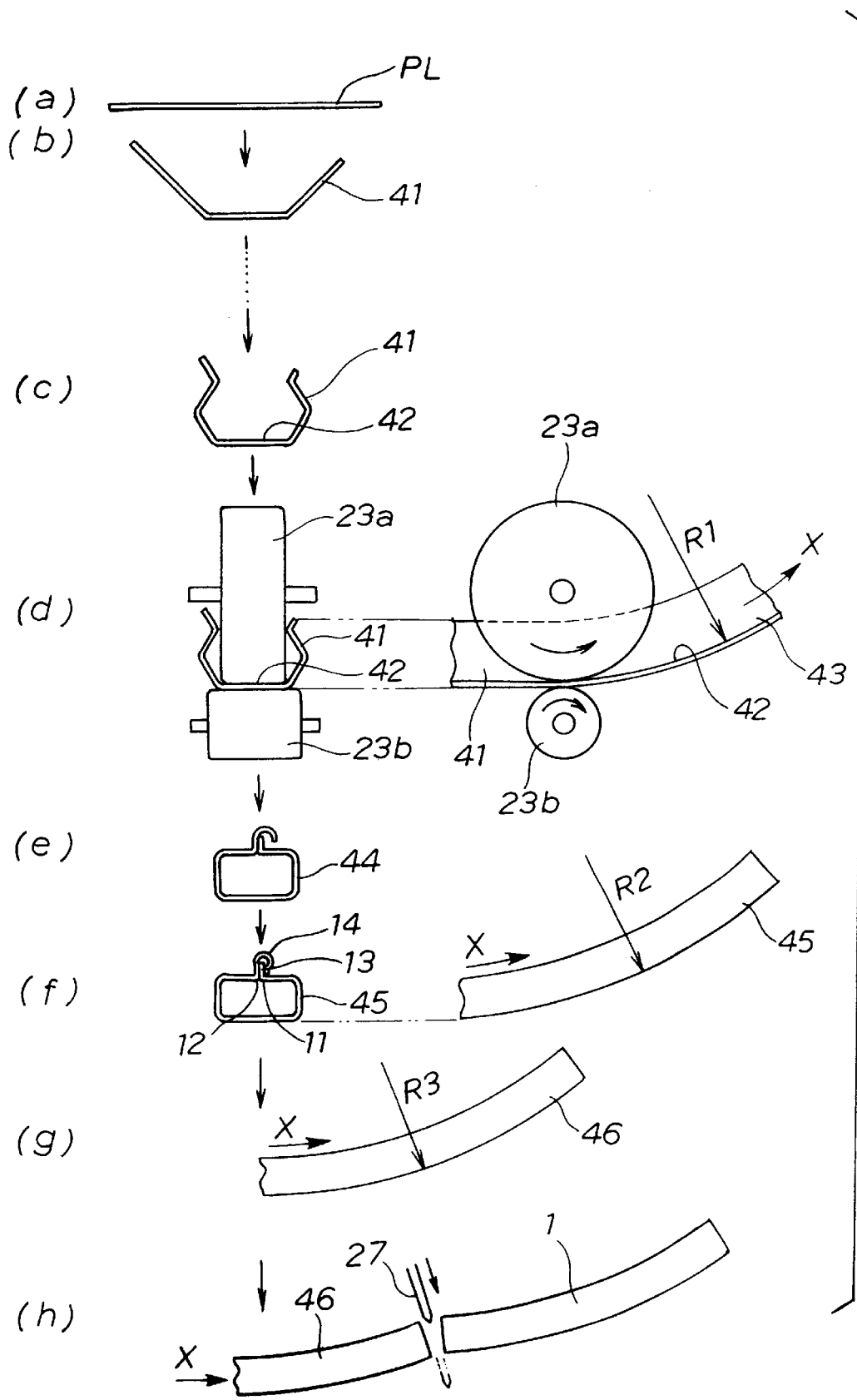

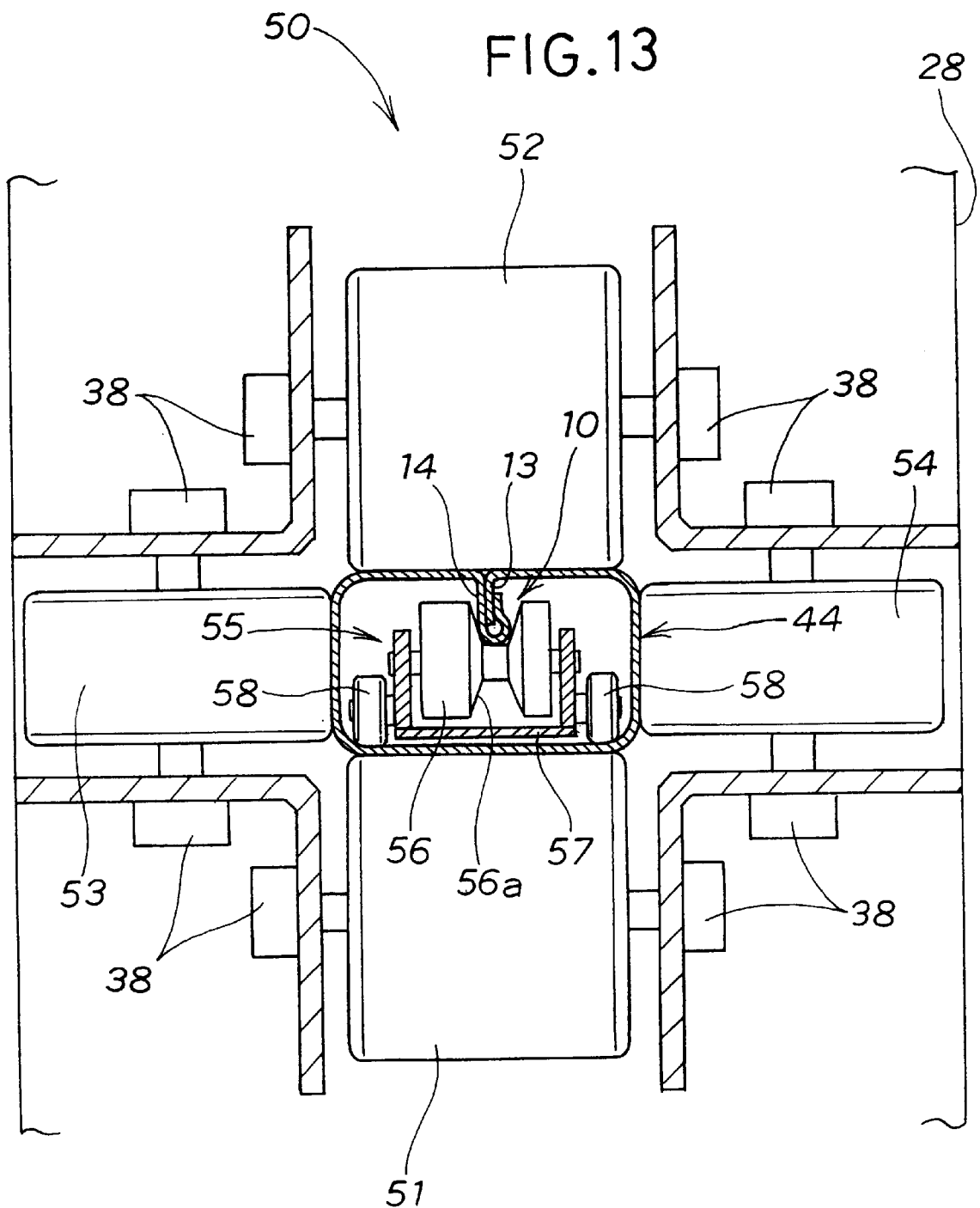

CURVED ELONGATE MEMBER OF CLOSED SECTIONAL SHAPE AND METHOD AND APPARATUS FOR FABRICATING THE SAME

BACKGROUND OF THE INVENTION

1. Field of the Invention

The present invention relates to curved elongate members of a closed sectional shape which are particularly suitable for use as bumper beams reinforcing automotive vehicle bumpers, as well as methods and apparatus for fabricating such closedsectional curved elongate members.

2. Related Prior Art

As bumper-reinforcing beams (bumper beams) for automotive vehicles and the like, there have been used elongate tubular members which have a sectional shape of, for example, a closed rectangle and are curved along a longitudinal direction thereof. These elongate tubular members will hereinafter be referred to as "closed-sectional curved elongate members". Such closed-sectional curved elongate members are generally fabricated by pressing or rolling; in recent years, the rolling has been used more popularly than the pressing because it achieves higher productivity than the pressing. Examples of the known methods of fabricating the closedsectional curved elongate members using the rolling include a "method of fabricating a reinforcing member for a vehicle bumper" disclosed in Japanese Patent Laid-open Publication No. HEI-9-141329.

According to the disclosure in the No. HEI-9-141329 publication, closed-sectional curved elongate members are formed of a continuous plastic sheet or strip (typically a metal strip) sequentially supplied from an uncoiler disposed at an upstream end of a fabricating apparatus. More specifically, the disclosed fabricating method comprises a first roll-bending step, a laser welding step, a second roll-bending step and a cutting step.

In the first roll-bending step, the plastic strip supplied from the uncoiler is bent widthwise into a semifinished tubular structure having a substantially closed section by means of a roll-bending machine which includes a series of roller pairs, each made up of upper and lower rollers, disposed along a traveling direction of the strip (i.e., in an upstream-to-downstream direction). Also, as the strip sequentially passes through the roller pairs, it is progressively curved along the traveling direction, i.e., along its length.

Then, in the laser welding step, opposite longitudinal edge portions of the plastic strip, which have been caused to substantially butt against each other through the bending in the first roll-bending step, are welded together by a laser welding machine disposed downstream of the roll-bending machine, to thereby provide a finished tubular structure with a welded joint section.

Next, in the second roll-bending step, the finished tubular structure is further curved by means of a three-point roll-curving machine having three rollers disposed downstream of the laser welding machine. Finally, in the cutting step, the finished tubular structure with the welded joint section, transferred from the second roll-bending step, is cut into a predetermined length to provide the bumper-reinforcing member.

Because the bumper-reinforcing member fabricated by the method disclosed in the No. HEI-9-141329 publication is in the form of a closed-sectional curved elongate member, it has great rigidity against bending and twisting forces and great robustness against impacts as compared to the traditional open-sectional curved elongate member having its opposite longitudinal edge portions left unjointed.

However, because the method discussed in the No. HEI-9-141329 publication uses the expensive laser welding machine to butt-weld the opposite longitudinal edge portions of the semifinished tubular structure, it would require complicated manufacturing lines and increased costs. Further, if a high-tensile steel sheet is used as the strip, the butt-welded joint section would become more brittle (i.e., would have a reduced strength), so that there would arise a need for an extra step of locally annealing the butt-welded joint section.

SUMMARY OF THE INVENTION

It is accordingly an object of the present invention to provide a closed-sectional curved elongate member which can be fabricated in quantity at low costs in a greatly simplified manner.

It is another object of the present invention to provide method and apparatus capable of fabricating a closed-sectional curved elongate member in quantity at low costs in a greatly simplified manner.

According to an aspect of the present invention, there is provided a closed-sectional curved elongate member which includes a crimped joint section that is formed on any one of a plurality of wall surfaces of the elongate member defining a closed section of the elongate member, the crimped joint section extending along a length of the elongate member, and which is curved along a longitudinal direction thereof.

The crimped joint section thus formed along the length of the elongate member can function as a rib reinforcing the elongate member, so that the closed-sectional curved elongate member of the present invention has rigidity equal to or greater than that of the conventional closed-sectional curved elongate member having the welded joint section.

The crimped joint section may be provided on either the outside or the inside of the elongate member. However, it is more preferable that the crimped joint section be provided inside the closed section of the elongate member, because the crimped joint section thus provided will not interfere with other components already placed or to be placed near the elongate member.

Further, it is preferable that the crimped joint section have gatherings that will achieve an increased strength of the joint.

According another aspect of the present invention, there is provided a method of fabricating a closed-sectional curved elongate member, which comprises: a step of bending a plastic strip, such as a metal strip, widthwise into a closed sectional shape by means of a series of bending rollers disposed along a longitudinal direction of the strip; a step of crimping together opposite longitudinal edge portions of the strip that are caused to substantially butt against each other through the bending by the step of bending, by means of crimping rollers, to thereby provide a closed-sectional elongate member with a crimped joint section; and a step of curving the closed-sectional elongate member along a length of the closed-sectional elongate member, by means of a series of curving rollers, as the closed-sectional elongate member is transferred in a predetermined traveling direction.

The step of curving may be initiated either after completion of the step of bending or during the step of crimping. However, performing the step of curving during the step of crimping is more preferable in that the curving step can be done concurrently with the crimping step and thus the overall necessary time for the fabrication can be significantly reduced.

According still another aspect of the present invention, there is provided an apparatus for fabricating a closed-sectional curved elongate member, which comprises: a roll-bending unit including a series of bending rollers disposed along a traveling direction of a plastic strip for bending the strip widthwise into a semifinished closed sectional shape; a rolling unit for rolling a bottom portion of the strip bent via the roll-bending unit, to thereby curve the strip along the traveling direction; a crimping-roll unit for sequentially crimping together opposite longitudinal edge portions of the strip that are caused to substantially butt against each other through the rolling by the rolling unit, to thereby provide a closed-sectional elongate member with a crimped joint section; and a roll-curving unit including a series of curving rollers for further curving the closed-sectional elongate member along the traveling direction.

The apparatus of the present invention can sequentially crimp together the substantially butting opposite longitudinal edge portions of the strip by means of the crimping-roll unit and can perform the crimping and curving of the elongate member in succession. Thus, the inventive apparatus can fabricate the closed-sectional curved elongate member in a greatly simplified manner.

Further, it is preferable that the crimping-roll unit comprise a gathering unit that, by means of a pair of gathering rollers, crimps together the substantially butting opposite longitudinal edge portions of the strip bent via the roll-bending unit, to thereby impart a series of gatherings in the longitudinal edge portions. In this case, the gatherings can be formed at the same time the opposite longitudinal edge portions of the strip are being crimped together.

BRIEF DESCRIPTION OF THE DRAWINGS

Certain preferred embodiments of the present invention will be described in greater detail with reference to the accompanying sheets of drawings, in which:

FIG. 5 is a diagram showing a step sequence for fabricating the closed-sectional curved elongate member shown in FIG. 1A;

FIG. 13 is a crimping-roll unit employed to fabricate the closed-sectional curved elongate member shown in FIG. 6;

DETAILED DESCRIPTION OF THE PREFERRED EMBODIMENTS

The following description is merely exemplary in nature and is in no way intended to limit the invention, its application or uses.

Figure 1A:
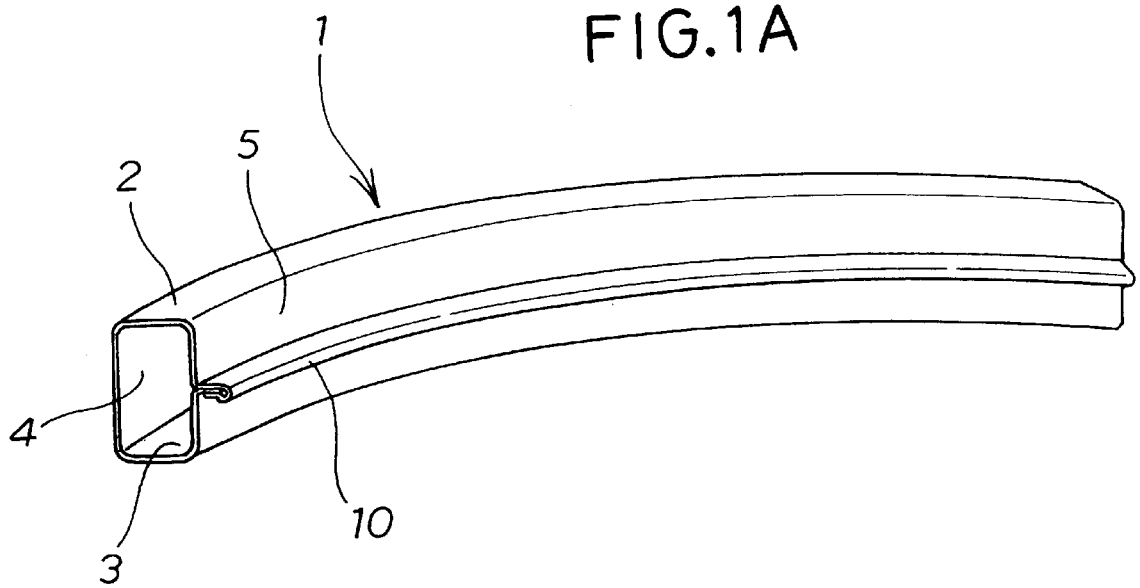
FIG. 1A is a perspective view showing a general configuration of a closed-sectional curved elongate member in accordance with a first embodiment of the present invention.

FIG. 1A is a perspective view showing a general configuration of a closed-sectional curved elongate member in accordance with a first embodiment of the present invention. As shown, the closed-sectional curved elongate member 1 has a sectional shape of a hollow rectangle and is curved along the full length thereof. The closed-sectional curved elongate member 1 is suitable for use as a structural member of an automotive vehicle and particularly as a bumper beam to reinforce the vehicle bumper.

Figure 1B:
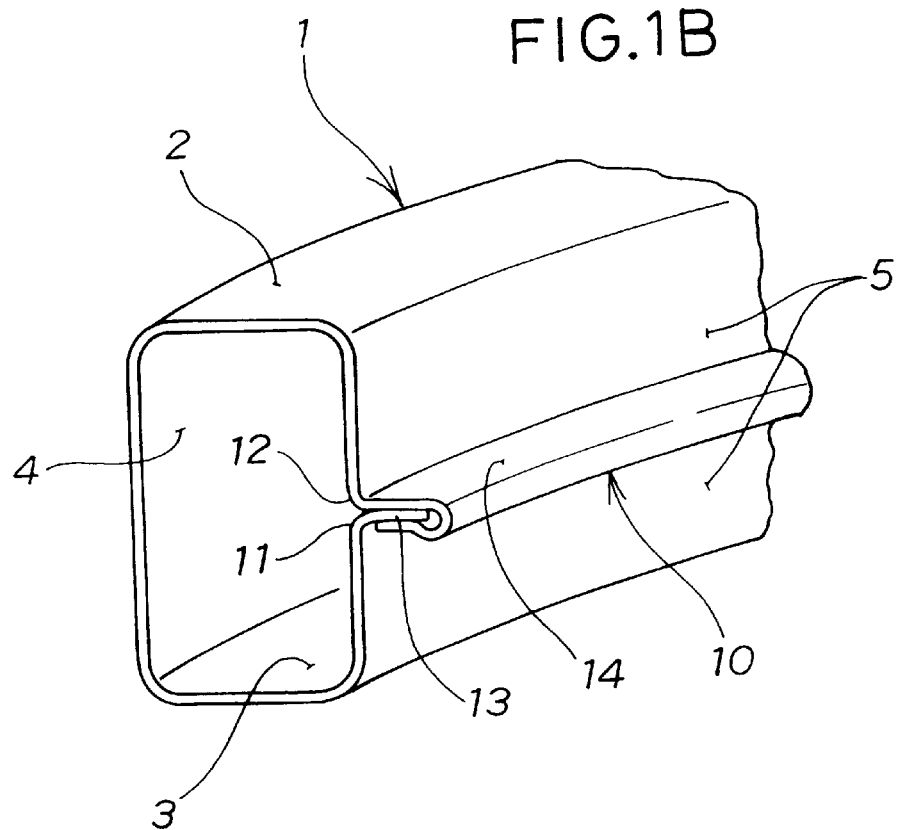
FIG. 1B is a fragmentary enlarged view of the closed-sectional curved elongate member shown in FIG. 1A.

Essentially, the elongate member 1 is formed by first bending a plastic strip widthwise into a semifinished tubular structure of a hollow rectangular sectional shape such that its opposite longitudinal edge portions substantially butt against each other, and then crimping together the substantially butting longitudinal edge portions so as to provide a finished tubular structure of a closed sectional shape, as shown in FIG. 1B. The elongate member 1, having been thus formed into the finished tubular structure of a hollow square or rectangular sectional shape, includes four flat walls: an upper wall 2; a lower wall 3; a left side wall 4; and right side wall 5, and a crimped joint section 10 formed centrally on any one of the four walls 2 to 5. In the illustrated example, the crimped joint section 10 is formed centrally on the right side wall 5.

Specifically, the crimped joint section 10 of the elongate member 1 is formed by crimping together two extensions 13 and 14 of the opposite longitudinal edge portions 11 and 12, having been caused to substantially butt against each other through the bending, into the semifinished tubular configuration, of the strip. More specifically, the extensions 13 and 14 protrude outwardly from the substantially butting longitudinal edge portions 11 and 12, respectively, in a superposed relation to each other. These extensions 13 and 14 are crimped together with one of the extensions 13 enfolded by the other extension 14. The crimped joint section 10 extends continuously along the full length of the elongate member 1, and thus it can function as a rib reinforcing the elongate member 1 in the longitudinal direction thereof to thereby increase rigidity of the entire elongate member 1.

Further, in the preferred embodiment, the strip used to form the elongate member 1 is a steel sheet or plate of high tensile strength. Thus, using such a high tensile strength steel plate, the elongate member 1 can be significantly reduced in weight and also is capable of effectively absorbing impact energy in case of collision of the vehicle against something else. The high tensile strength steel plate for forming the elongate member 1 may be, for example, a hot or cold rolled high tensile strength steel sheet with improved formability for automobile structural uses (JIS G 3134 SPFH; JIS G 3135 SPFC).

Figure 2:
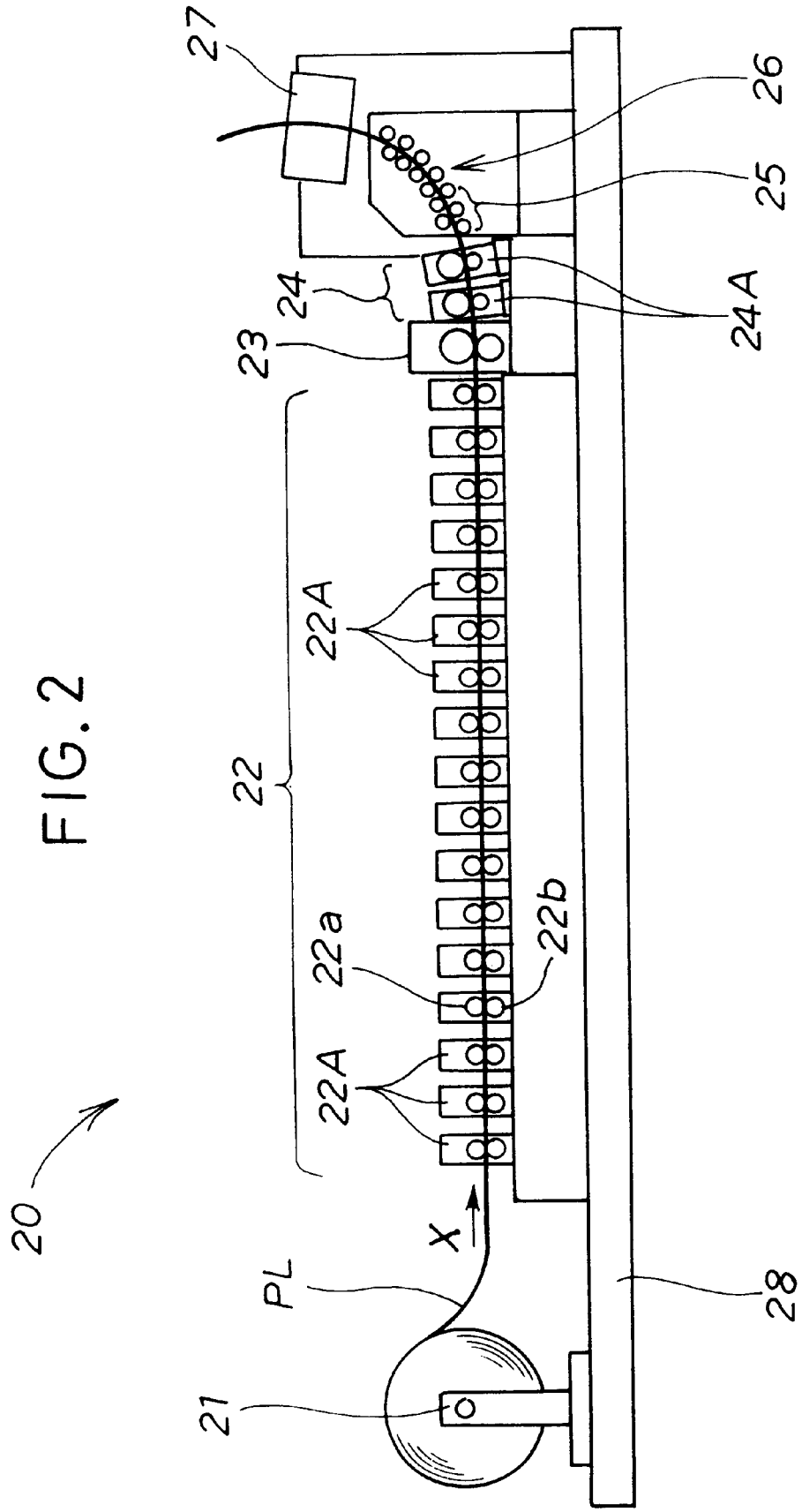
FIG. 2 is a view schematically showing an apparatus for fabricating the closed-sectional curved elongate member shown in FIG. 1A.

FIG. 2 is a view schematically showing an apparatus for fabricating the elongate member 1 of the above-mentioned construction. In FIG. 2, reference numeral 28 represents a frame of the elongate-member fabricating apparatus 20, on which are supported various components as will be described below. The elongate-member fabricating apparatus 20 includes an uncoiler 21 disposed at an upstream end of the apparatus, on which the continuous plastic strip PL is wound and from which the strip PL is supplied sequentially to downstream processing units. Of the processing units, a front-stage roll-bending unit 22 is disposed downstream of the uncoiler 21 and bends widthwise the plastic strip PL, uncoiled or supplied from the uncoiler 21, into a semifinished tubular structure, i.e., a semifinished closed-sectional elongate member. The front-stage roll-bending unit 22 comprises a series of bending roller sets 22A disposed along a traveling direction x of the strip, and each of the roller sets 22A includes a pair of upper and lower rollers 22a and 22b and a pair of left and right rollers (not shown). Further, downstream of the front-stage roll-bending unit 22, there is provided a rolling unit 23 which curves the semifinished elongate member along the length of the elongate member by rolling the elongate member along the strip traveling direction X. Rear-stage roll-bending unit 24 is disposed downstream of the rolling unit 23 and further bends the semifinished elongate member widthwise into a substantially rectangular sectional configuration such that the opposite longitudinal edge portions of the elongate member substantially butt against each other or placed close enough to each other for subsequent crimping. Downstream of the rear-stage roll-bending unit 24, there. is provided a crimping-roll unit 25 which crimps together the butting opposite longitudinal edge portions of the elongate member sequentially in the longitudinal direction of the elongate member, to thereby provide the crimped joint section 10 and hence the finished tubular structure (i.e., closed-sectional elongate member) as shown in FIG. 1B. Roll-curving unit 26 is disposed downstream of the crimping-roll unit 25 and further curves the closed-sectional elongate member, delivered from the crimping-roll unit 25, along the strip traveling direction x, to thereby provide the closed-sectional curved elongate member with the crimped joint section 10. Further, downstream of the roll-curving unit 26, there is provided a cutting unit 27 for cutting the closed-sectional curved elongate member into a predetermined length.

The fabricating apparatus 20 as shown in FIG. 2 is characterized by the provision of the front- and rear-stage roll-bending units 22 and 24 with the rolling unit 23 interposed therebetween. Such a combination of the units 22, 23 and 24 allows the curving process to be initiated upon completion of the process of bending the strip PL into the finished tubular structure of the rectangular sectional shape.

Figure 3:
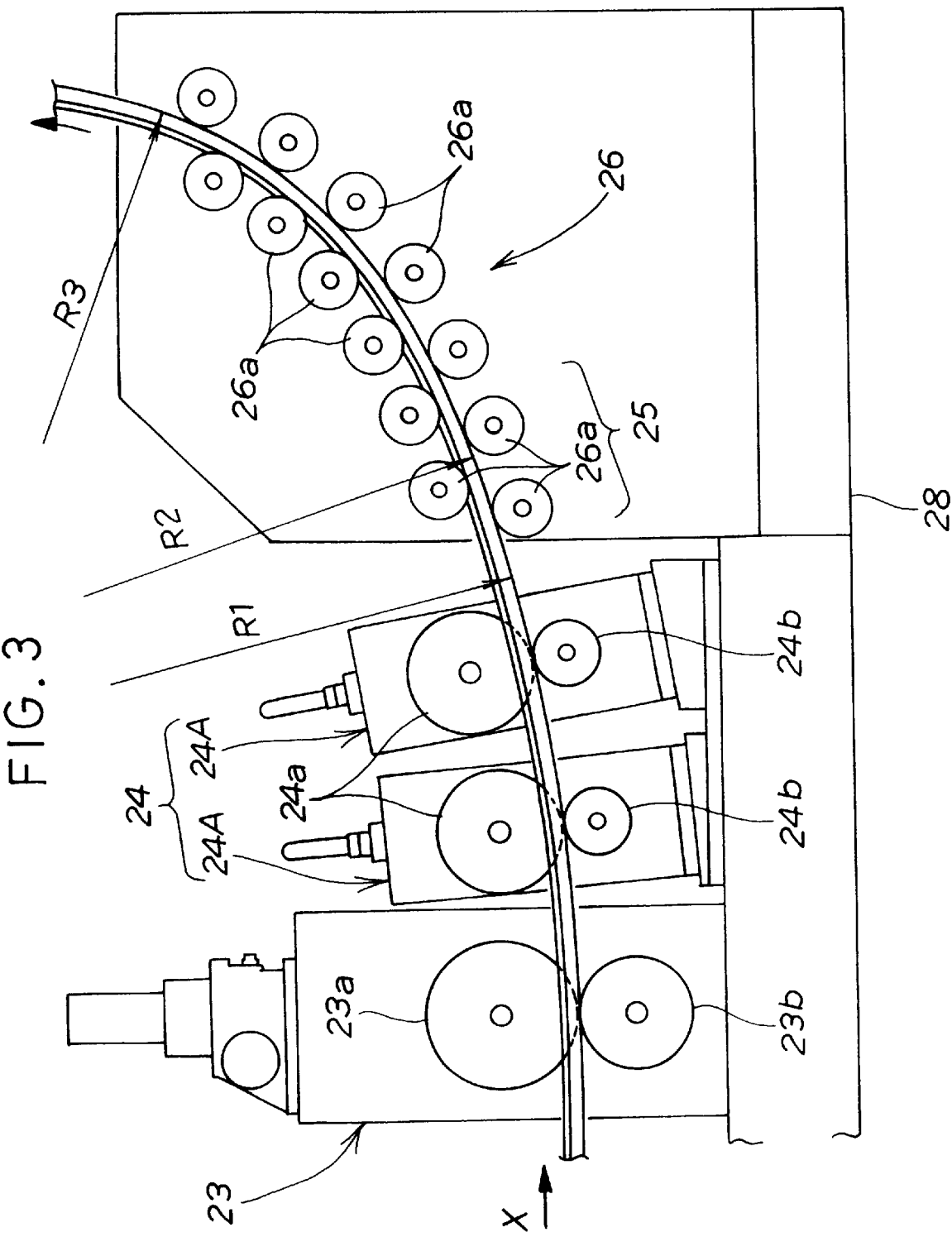
FIG. 3 is an enlarged fragmentary view of the apparatus shown in FIG. 2.

FIG. 3 is an enlarged fragmentary view of the fabricating apparatus shown in FIG. 2. In FIG. 3, the rolling unit 23 includes a pair of upper and lower rollers 23a and 23b. The plastic strip is curved along its longitudinal direction into a predetermined first radius of curvature R1, by adjusting a rolling force with which the strip is rolled by the rollers 23a and 23b; specifically, the strip PL, having been bent via the front-stage roll-bending unit 22 into the semifinished tubular structure (semi-closed rectangular sectional configuration), is rolled at its bottom portion between the rollers 23a and 23b until it is bent to the predetermined first radius of curvature R1.

The rear-stage roll-bending unit 24 comprises front and rear bending roller sets 24A each including a pair of upper and lower rollers 24a and 24b and a pair of left and right rollers (not shown).

The roll-curving unit 26 comprises a plurality of curving roller sets disposed along the strip traveling direction x, with each of the roller sets including three small curving rollers 26a. In this embodiment, the leading one of the curving roller sets constitutes the above-mentioned crimping-roll unit 25.

Fore half of the roll-curving unit 26 progressively curves the elongate member from the first radius of curvature R1 to a predetermined second radius of curvature R2, and then a rear half of the roll-curving unit 26 progressively curves the elongate member from the second radius of curvature R2 to a predetermined third radius of curvature R3. Accordingly, the elongate member is curved via the roll-curving unit 26 successively from the first radius of curvature R1 to the third radius of curvature R3. Here, the second radius of curvature R2 is smaller than the first radius of curvature R1, and the third radius of curvature R3 is smaller than the second radius of curvature R2 (i.e., R1>R2>R3). In this way, the elongate member is progressively curved into the predetermined radius of curvature as it is transferred in the strip traveling direction x.

Figure 4:
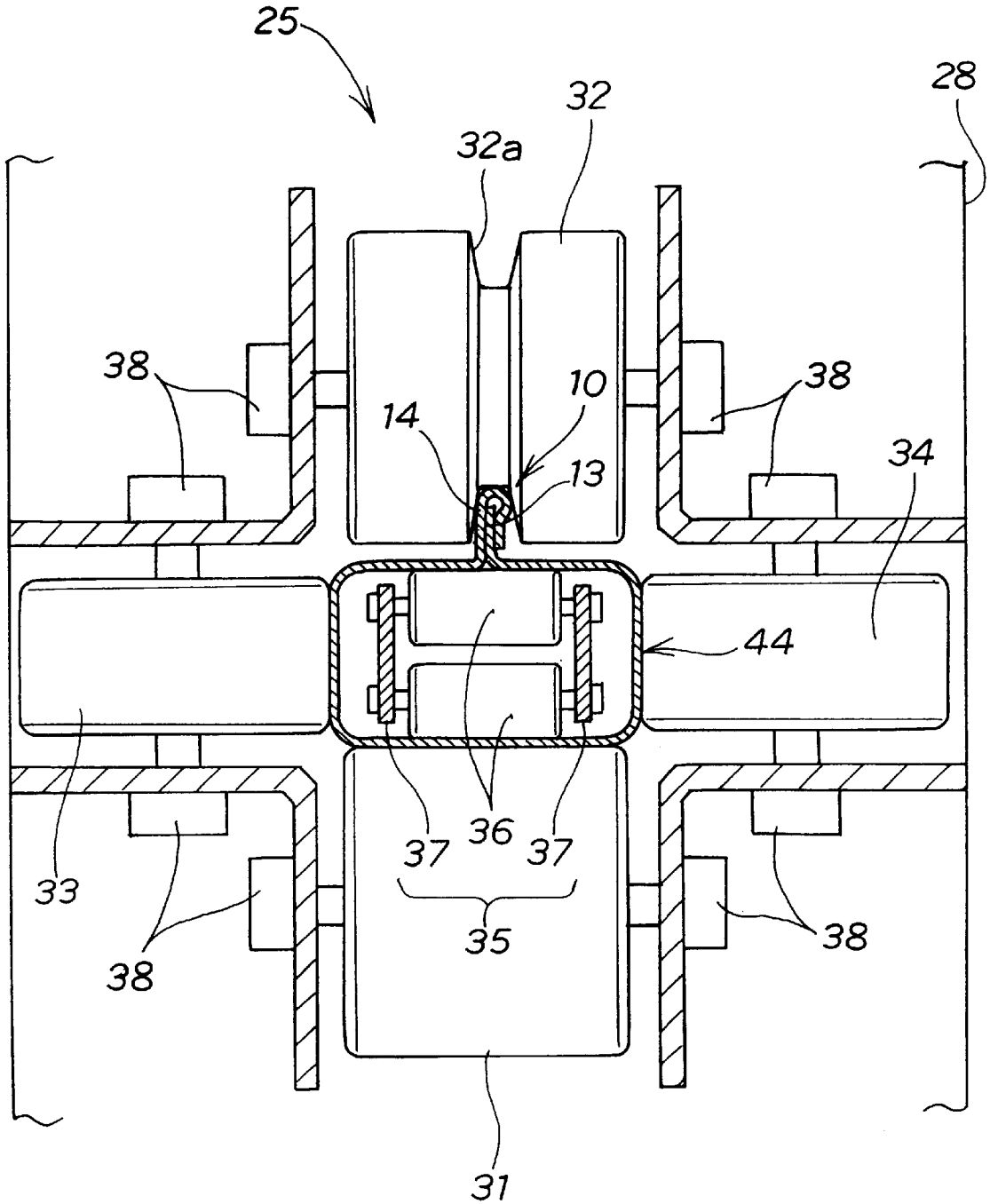
FIG. 4 is an enlarged fragmentary view, in section, of a crimping-roll unit shown in FIG. 3.

FIG. 4 is a sectional view showing details of the crimping-roll unit 25. More particularly, FIG. 4 is explanatory of a manner in which the crimping-roll unit 25 crimps together the opposite longitudinal edge portions to form the crimped joint section 10 as the elongate member 44 having the semifinished tubular configuration 44 is moved in a direction normal to the sheet of the drawing, i.e., from the obverse side to the reverse side of the sheet.

The crimping-roll unit 25 includes a lower roller 31 for supporting the underside of the elongate member 44, an upper roller 32 for pressing and crimping the opposite longitudinal edge portions of the elongate member 44, left and right rollers 33 and 34 for supporting the left and right side surfaces of the elongate member 44, and an auxiliary roller mechanism 35 for preventing the elongate member 44 from collapsing vertically when the opposite longitudinal edge portions of the elongate member 44 are being crimped together by the upper or crimping roller 32.

The upper or crimping roller 32 has a central crimping groove 32a that is formed around its outer peripheral surface for receiving and crimping together the extensions 13 and 14 protruding outwardly from the butting longitudinal edge portions 11 and 12 of the elongate member 44. Namely, opposed inner side surfaces of the crimping roller 32, defining the crimping groove 32a, firmly press the extensions 13 and 14 against each other to join them together into narrow folds.

The auxiliary roller mechanism 35 includes a pair of upper and lower rollers 36 and a pair of links 37 for rotatably supporting the upper and lower rollers 36 in place. Bearings 38 in FIG. 4 rotatably support the respective shafts of the lower roller 31, upper or crimping roller 32 and left and right rollers 33 and 34.

The following paragraphs describe a method, i.e., a sequence of steps, for fabricating the closed-sectional curved elongate member 1 of FIG. 1, with reference to FIGS. 2 and 5.

First, the plastic strip PL is supplied from the uncoiler 21 of FIG. 2 in the traveling direction x, as shown in part (a) of FIG. 5 (strip supply step).

Then, as shown in parts (b) and (c) of FIG. 5, the supplied strip PL is bent widthwise, via the front-stage roll-bending unit 22 of FIG. 2, into a semifinished tubular structure of a substantially rectangular sectional shape opening upwardly, to thereby provide a semifinished elongate member 41 (first bending step).

After completion of the first bending step, the semifinished elongate member 41 is curved along its length, i.e., along the strip traveling direction x, into the first radius of curvature R1 as shown in part (d) of FIG. 5 (first curving step). More specifically, the semifinished elongate member 41 is passed between the upper and lower rollers 23a and 23b of the rolling unit 23 of FIG. 2 so that the elongate member 41 is curved at its bottom 42 with the first radius of curvature. As a result of this first curving step, there is provided a semifinished curved elongate member 43 having the upwardly-opening rectangular sectional shape.

Then, as shown in part (e) of FIG. 5, the semifinished curved elongate member 43 is further bent, via the rear-stage roll-bending unit 24 of FIG. 2, to such an extent that the opposite longitudinal edge portions of the elongate member 43 are caused to substantially butt against each other or placed close enough to each other for subsequent crimping (second bending step). As a result of this second bending step, there is provided a semifinished closed-sectional curved elongate member 44.

Further, as shown in part (f) of FIG. 5, the semifinished closed-sectional curved elongate member 44 is delivered to the crimping-roll unit 25, where the extensions 13 and 14 protruding outwardly from the butting longitudinal edge portions 11 and 12 of the elongate member 44 are crimped together (crimping step). Also, the elongate member 44 is further curved from the first radius of curvature R1 to the second radius of curvature R2 (second curving step). As a result of these steps, there is provided a finished closed-sectional curved elongate member 45 having the crimped joint section 10 along the full length thereof.

Then, as shown in part (g) of FIG. 5, the finished closed-sectional curved elongate member 45 with the crimped joint section 10, provided by the steps of part (f) of FIG. 5, is further curved from the second radius of curvature R2 to the third radius of curvature R3 (third curving step). As a result, there is provided a completely-finished closed-sectional curved elongate member 46.

Finally, the completely-finished closed-sectional curved longate member 46 is cut via the cutting unit 27 into a predetermined length (cutting step), so that the predetermined length of the completely-finished closed-sectional curved elongate member 46 can be provided.

As understood from the foregoing, the successive curving steps in the present invention are initiated after the bending of the strip into the semifinished tubular structure of the substantially rectangular section.

Figure 6A:
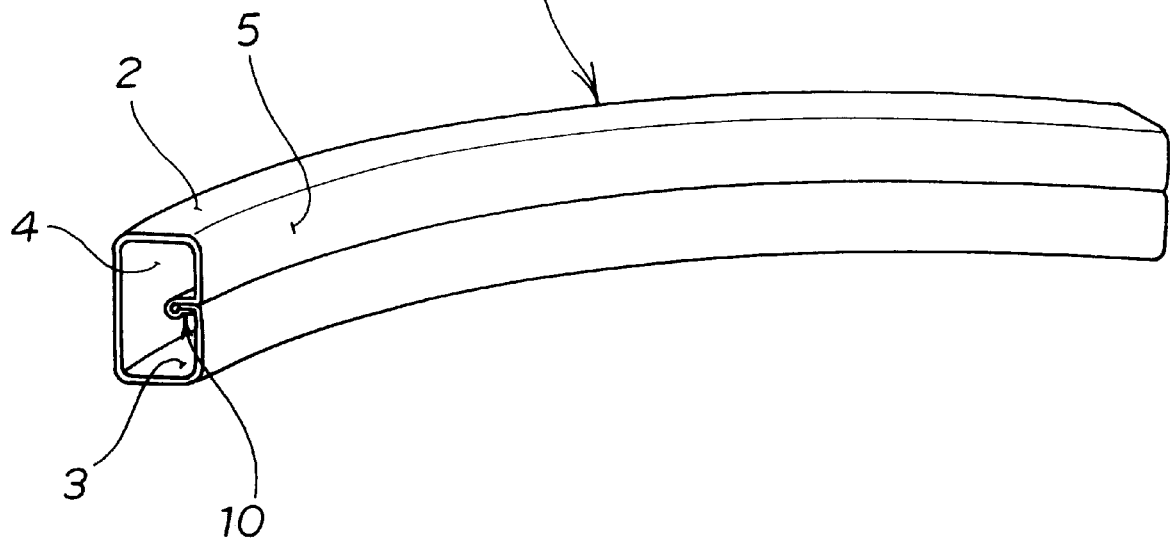
FIG. 6A is a perspective view showing a general configuration of a closed-sectional curved elongate member in accordance with a second embodiment of the present invention.
Figure 6B:
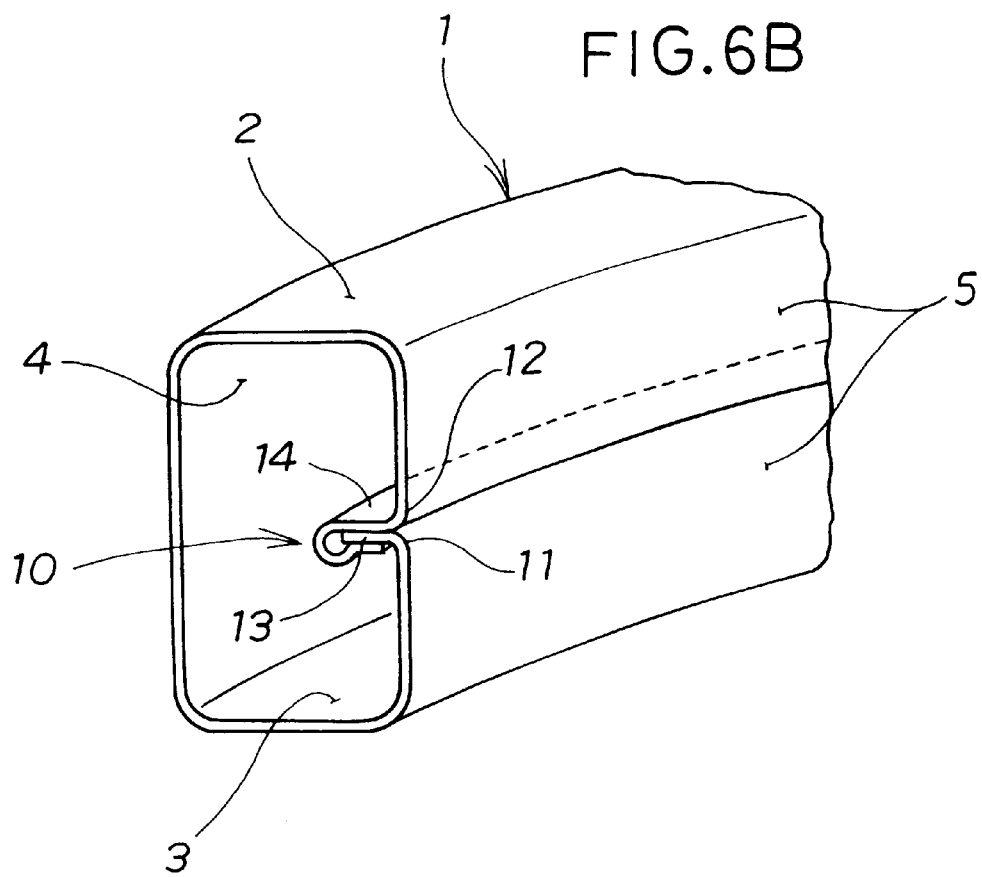
FIG. 6B is a fragmentary enlarged view of the closed-sectional curved elongate member shown in FIG. 6A.

FIGS. 6A and 6B are perspective views of a closed-sectional curved elongate member in accordance with a second embodiment of the present invention. The elongate member 1 according to the second embodiment is characterized in that the crimped joint section 10 is formed on an inner wall surface, i.e., inside the closed section, of the elongate member 1 so that the joint section 10 is invisible from outside the elongate member 1, which greatly enhances the appearance of the elongate member 1 as a product.

Specifically, in the crimped joint section 10 of the closed-sectional curved elongate member 1 shown in FIGS. 6A and 6B, the extensions 13 and 14 protrude inwardly from the butting longitudinal edge portions 11 and 12, respectively, in a superposed relation to each other. These extensions 13 and 14 are pressed and crimped together with one of the extensions 13 enfolded by the other extension 14. More specifically, the crimped joint section 10 is formed centrally on the inner surface of any one of the four walls 2–5 that together constitute the closed-sectional configuration, and it protrudes inwardly from the one wall at right angles to the inner surface of that wall. The thus-formed crimped joint section 10 extends continuously along the full length of the elongate member 1 as in the above-described first embodiment.

Other structural features of the second embodiment and material used in the second embodiment are the same as in the first embodiment and will not be described here to avoid unnecessary duplication.

Now, with reference to FIGS. 7–12, a description will be given about results of various bending tests performed on the closed-sectional curved elongate member 1 with the crimped joint section 10 as shown in FIG. 6 and the conventionally-known closed-sectional curved elongate member with the welded joint section as discussed earlier in the introductory part of this specification.

Figure 7A:
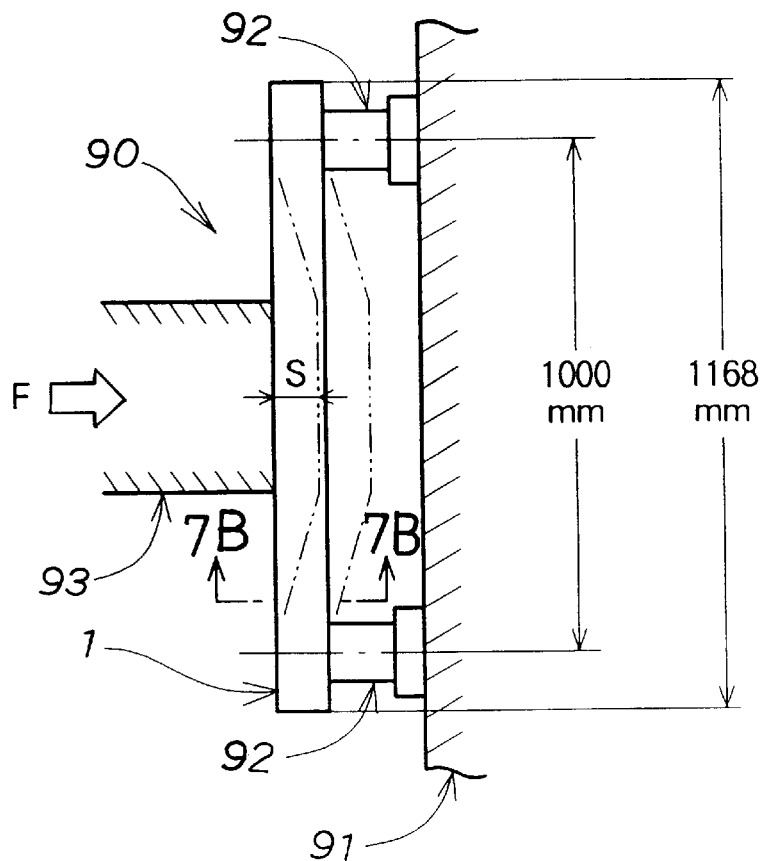
FIGS. 7A and 7B are schematic views of a bending test device used in bending tests performed on the closed-sectional curved elongate member of FIG. 6.

The bending tests were performed using a bending test device 90 as shown in FIG. 7A, which includes a fixed base 91, a pair of jigs 92 for clamping the to-be-tested closed-sectional curved elongate member 1, i.e., the test sample, at opposite ends thereof so that the elongate member 1 can be secured to the base 91, and a jig 93 for pressing a central portion of the to-be-tested closed-sectional curved elongate member 1 toward the fixed base 91. In the following description, a pressing force applied by the pressing jig 93 is represented by F and a stroke of the pressing jig 93 is represented by S. The stroke S of the pressing jig 93 corresponds to an amount of deformation or flection of the longate member 1.

Figure 7B:
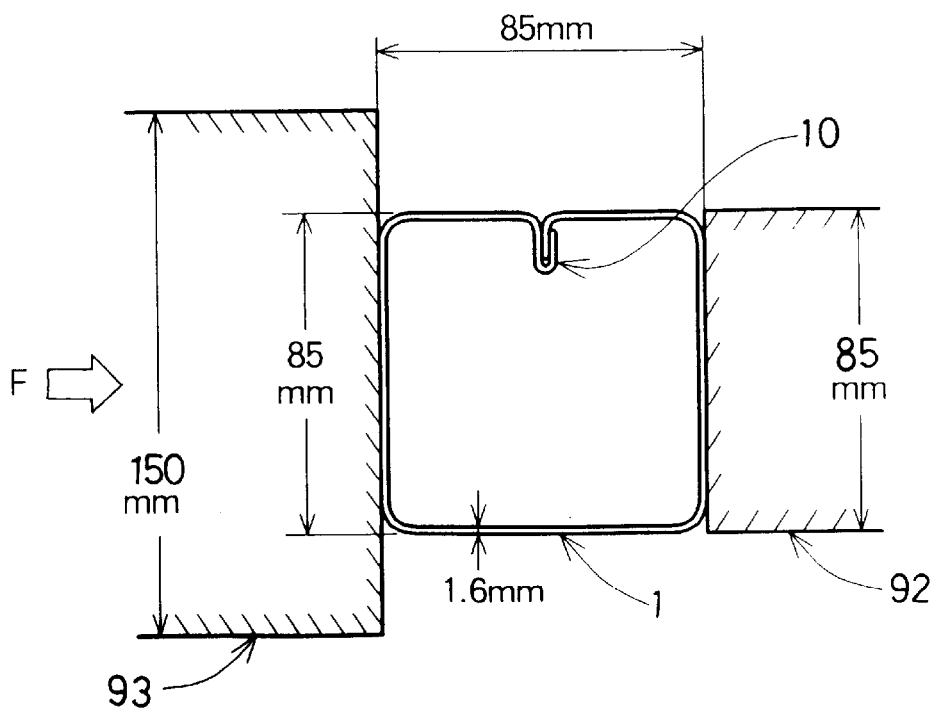

The elongate member 1 had a wall thickness of 1.6 mm and a square section of 85 mm×85 mm, as illustrated in FIG. 7B. The elongate member 1 was clamped by the pair of clamping jigs 92 disposed at a pitch of 1,000 mm. The pressing jig 93 had a 150 mm height and a 300 mm width, and the clamping jigs 92 each had a 85 mm height and a 60 mm width. Further, the elongate member 1 was formed of a high-tensile steel plate cold-rollable for automobile manufacturing based on the JIS G 3135 SPFC standard. The tests were performed in relation to various positions, on the elongate member, of the crimped joint section 10, as shown in FIGS. 8–11.

Figure 8A:
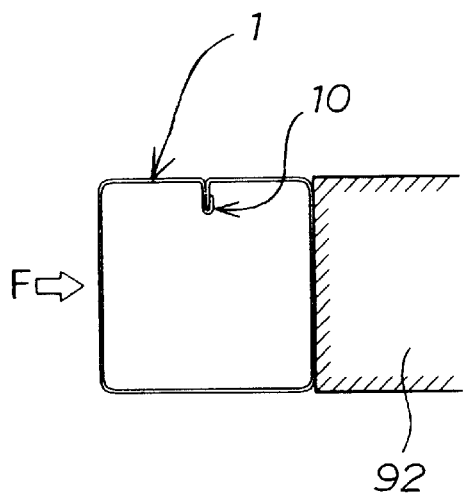
FIG. 8A is a view explanatory of a first bending test that was performed on the elongate member with its crimped joint section provided on its upper wall.
Figure 8B:
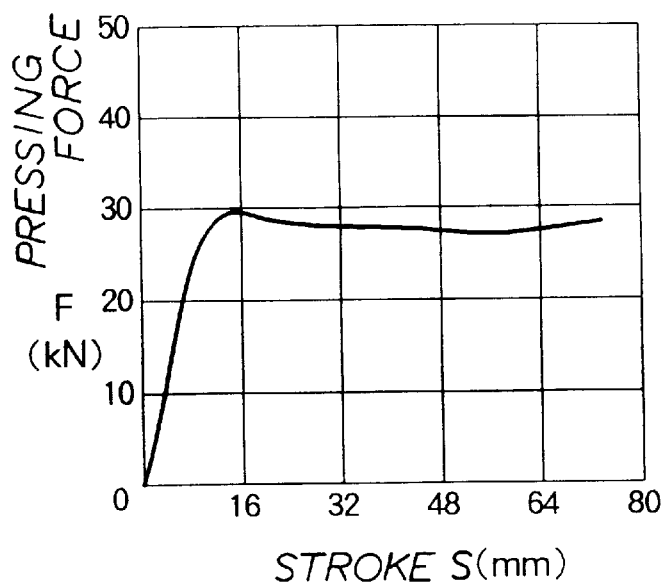
FIG. 8B is a graph showing results of the first bending test.

The first bending test was performed on the elongate member 1 with the crimped joint section 10 provided on its upper wall as shown in FIG. 8A. Results of this first bending test are shown in the graph of FIG. 8B, where the vertical axis represents the pressing force that acted as a bending load on the elongate member 1 while the horizontal axis represents the amount of flection (deformation) of the test sample 1 as the stroke S of the pressing jig 93 shown in FIG. 7A. According to the graph of FIG. 8B, the pressing force F reached a maximum value of about 30 kN when the stroke S was about 16 mm, after which the stroke S changed with substantially the same maximum pressing force F. Namely, the test sample 1 deformed elastically while the amount of deformation was not greater than about 16 mm, but deformed plastically with a constant pressing force F after the maximum pressing force of 30 kN was reached.

Figure 9A:
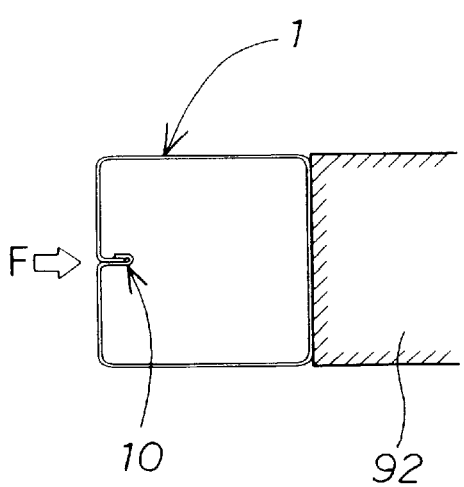
FIG. 9A is a view explanatory of a second bending test that was performed on the elongate member with its crimped joint section provided on its left side wall adjacent a pressing jig.
Figure 9B:
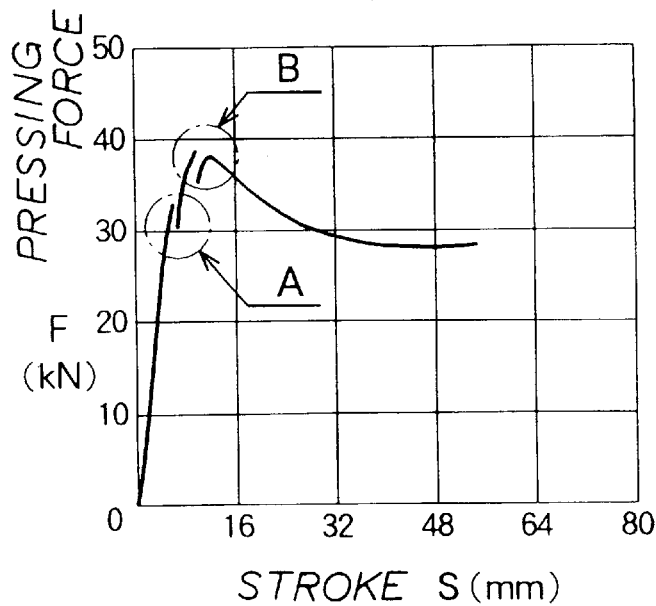
FIG. 9B is a graph showing results of the second bending test.

The second bending test was performed on the elongate member 1 with the crimped joint section 10 provided on the left side wall adjacent the pressing jig 93 (i.e., opposite to the clamping jigs 92) as shown in FIG. 9A. Results of this second bending test are shown in the graph of FIG. 9B. According to the graph of FIG. 9B, the crimped joint section 10 was disjointed or forced out of the duly crimped state between arrowed points A and B. The A point is where the disjointed condition took place in a portion of the elongate member 1 located lower than the pressing jig 93 in FIG. 7A, while the B point is where the disjointed condition took place in a portion of the elongate member 1 located higher than the pressing jig 93. Namely, the disjointed condition of the crimped joint section 10 first took place at the A point and then at the B point. Following the B point, the test sample 1 deformed with the pressing force F of about 30 kN.

Figure 10A:
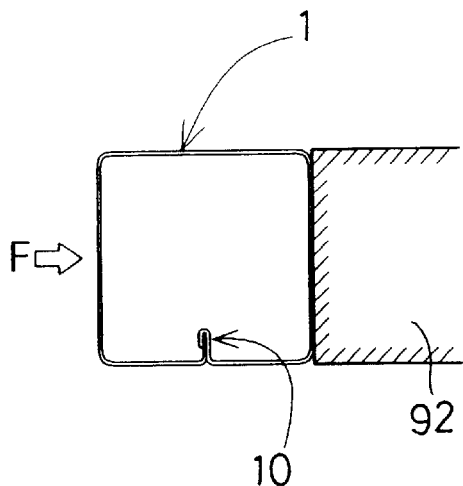
FIG. 10A is a view explanatory of a third bending test that was performed on the elongate member with its crimped joint section provided on its lower wall.
Figure 10B:
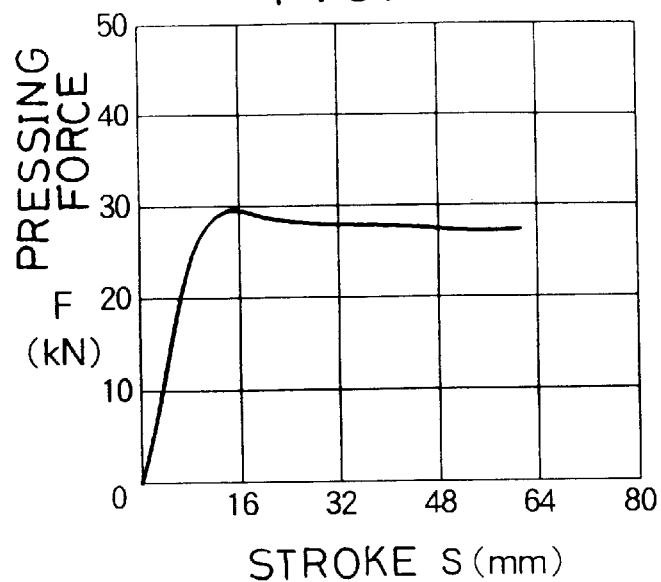
FIG. 10B is a graph showing results of the third bending test.

The third bending test was performed on the elongate member 1 with the crimped joint section 10 provided on the lower wall as shown in FIG. 10A. Results of this third bending test are shown in the graph of FIG. 10B. According to the graph of FIG. 10B, the pressing force F reached a maximum value of about 30 kN when the stroke S was about 16 mm, after which the stroke S changed with substantially the same maximum pressing force F. Namely, the third bending test showed the same results as the first bending test shown in FIG. 8B.

Figure 11A:
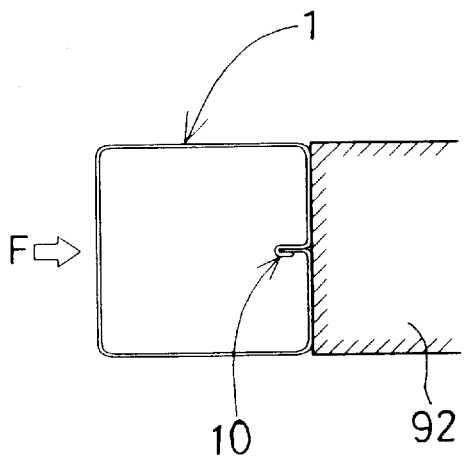
FIG. 11A is a view explanatory of a fourth bending test that was performed on the elongate member with its crimped joint section provided on its right side wall adjacent clamping jigs.

The fourth bending test was performed on the elongate member 1 with the crimped joint section 10 provided on the right side wall adjacent the clamping jigs 92 (i.e., remote from the pressing jig 93) as shown in FIG. 11A. Results of this fourth bending test are shown in the graph of FIG. 11B.

Figure 11B:
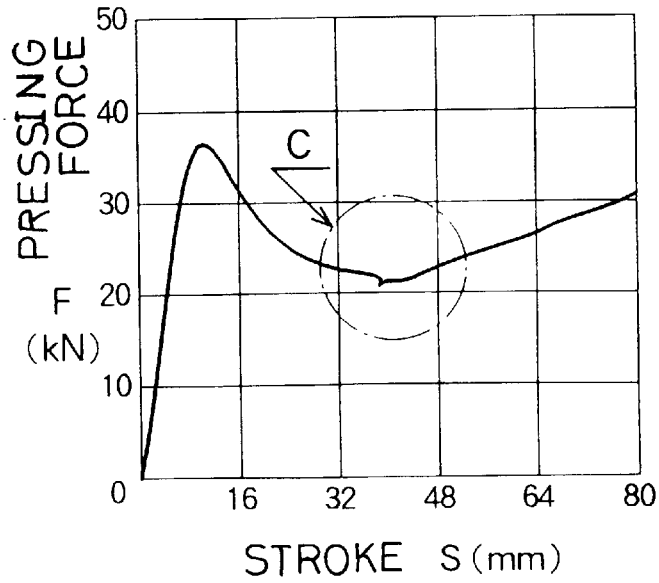
FIG. 11B is a graph showing results of the fourth bending test.

According to the graph of FIG. 11B, deformation occurred, at an arrowed point C, in clamping holes in the test sample 1 due to the rigidity of the crimped joint section 10. Then, the maximum pressing force F was 35 kN.

Figure 12A:
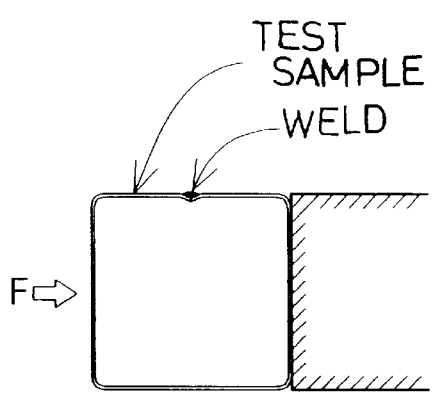
FIG. 12A is a view explanatory of a fifth bending test that was performed on a conventional closed-sectional curved elongate member having a welded joint section.
Figure 12B:
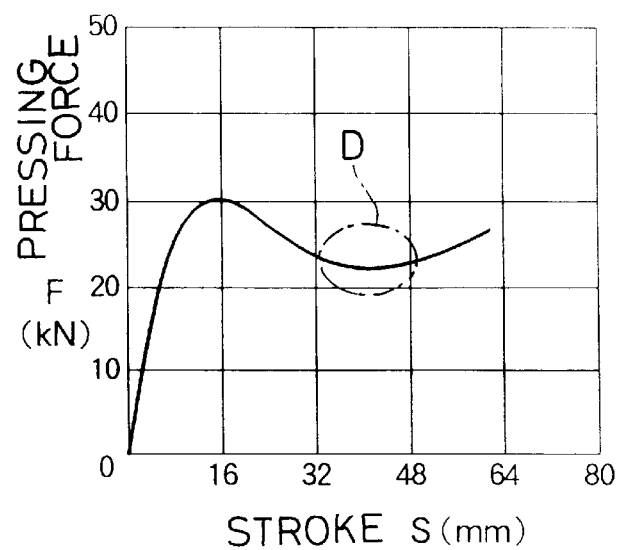
FIG. 12B is a graph showing results of the fifth bending test.

The fifth bending test was performed on the conventional closed-sectional curved elongate member with the welded joint section, where the welded joint section was provided on the upper wall as shown in FIG. 12A similarly to the FIG. 8A case. Results of this fifth bending test are shown in the graph of FIG. 12B. According to the graph of FIG. 12B, the pressing force F reached a maximum value of about 30 kN when the stroke S was about 16 mm. At a point D circled by a dot-and-dash line, the pressing force temporarily dropped because the test sample had no such crimped joint section as shown in FIGS. 8A to 10A and did not present enough rigidity against the pressing force applied by the pressing jig 93.

The above-described bending test results clearly showed that the crimped joint section 10 formed on the inventive elongate member 1 achieved generally the same bending strength as the conventional welded joint section, irrespective of which one of the upper, lower, left and right walls, constituting the closed rectangular sectional configuration, the crimped joint section 10 was provided. Particularly, when the bending test was performed on the elongate member 1 with the crimped joint section 10 provided on the upper or lower wall as shown in FIG. 8A or FIG. 10A, the variation characteristic of the stroke S responsive to the generally constant pressing force F was better than in the conventional elongate member equipped with the welded joint section.

From the test results, it should be evident that the inventive closed-sectional curved elongate member 1 with the crimped joint section 10 can be quite suitable for use as a structural component, especially a bumper beam, of an automotive vehicle. In the case where the inventive closed-sectional curved elongate member 1 is used as a bumper beam subject to impact energy from forward, it is preferable that the crimped joint section 10 be provided on one of the surfaces intersecting the direction in which the impact energy acts on the bumper beam. Namely, in the case where the inventive closed-sectional curved elongate member 1 as shown in FIG. 6A or 6B is used as a bumper beam of an automotive vehicle, the crimped joint section 10 is preferably provided to protrude upward or downward from the lower or upper wall of the elongate member 1.

Apparatus for fabricating the closed-sectional curved elongate member 1 in accordance with the second embodiment as shown in FIG. 6 can be readily constructed by only replacing the crimping-roll unit 25 of FIGS. 2 and 3 with a modified crimping-roll unit 50 shown in FIG. 13. Further, the closed-sectional curved elongate member 1 according to the second embodiment of the present invention may be fabricated using the same step sequence as described earlier in relation to FIG. 5.

The following paragraphs describe the crimping-roll unit 50 that is employed to form the crimped joint section 10 on the closed-sectional curved elongate member 1 of FIG. 6, with reference to FIG. 13. As shown in FIG. 13, the crimping-roll unit 50 includes a lower roller 51 for supporting the underside of the elongate member 44, an upper roller 52 for engaging the upside of the elongate member 44, left and right rollers 53 and 54 for supporting the left and right side surfaces of the elongate member 44, and a crimping mechanism 55 for crimping the opposite longitudinal edge portions of the elongate member 44 within the closed section of the elongate member 44.

Further, the crimping mechanism 55 is connected to a supporting rod (not shown) that was previously inserted in the elongate member 44 through an opening of the semifinished tubular elongate member 44. This crimping mechanism 55 includes a crimping roller 56, a base 57 for rotatably supporting the crimping roller 56, and a pair of left and right wheels 58 rotatably mounted on opposed sides of the base 57. The crimping roller 56 has a central crimping groove 56a that is formed around its outer peripheral surface for receiving and crimping together the extensions 13 and 14 protruding inwardly from the substantially butting longitudinal edge portions of the elongate member 44. Namely, opposed inner side surfaces of the crimping roller 56, defining the crimping groove 56a, firmly press the extensions 13 and 14 against each other to join them together into narrow folds.

Figure 14A:
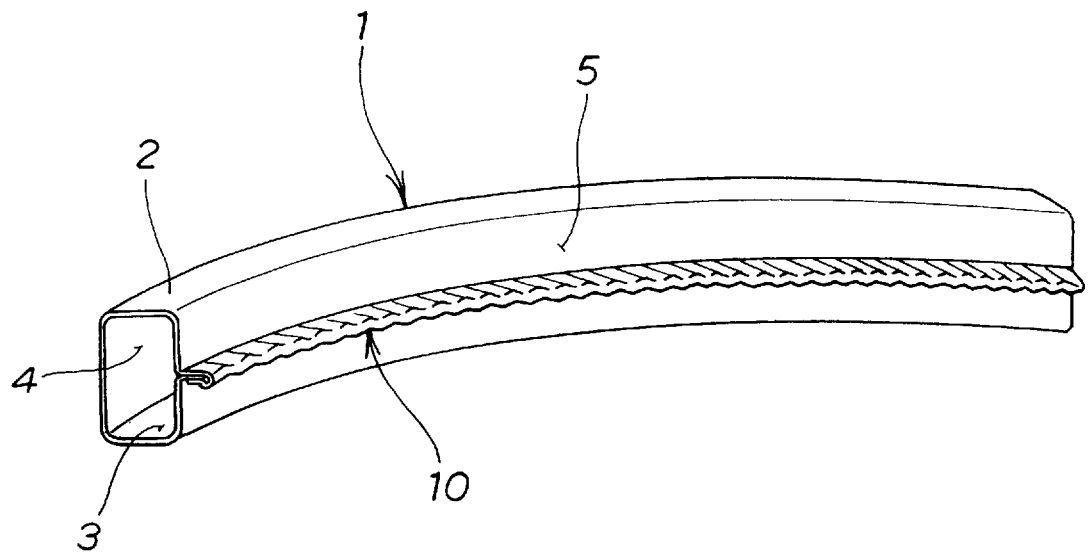
FIG. 14A is a perspective view showing a general configuration of a modification of the closed-sectional curved elongate member shown in FIG. 1.
Figure 14B:
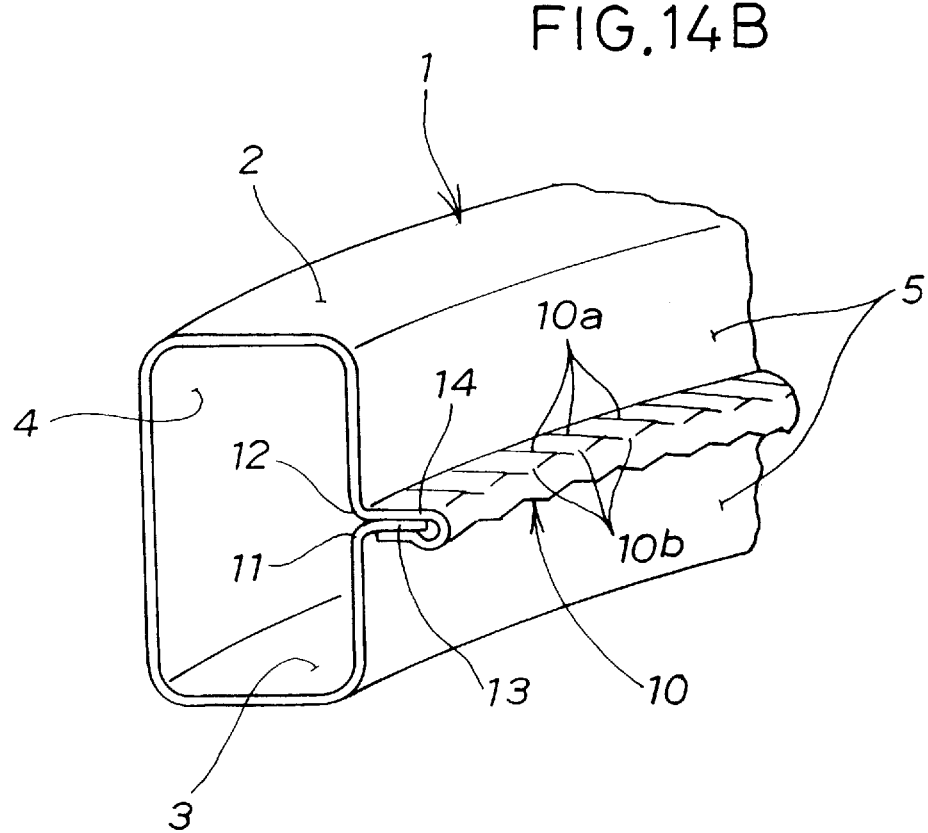
FIG. 14B is a fragmentary enlarged view of the modified closed-sectional curved elongate member of FIG. 14A.

FIGS. 14A and 14B are perspective views schematically showing a modification of the closed-sectional curved elongate member 1 of FIGS. 1A and 1B. This modified closed-sectional curved elongate member 1 is characterized in that the crimped joint section 10 has gatherings. In the crimped joint section 10, extensions 13 and 14 protrude outwardly from the butting longitudinal edge portions 11 and 12, respectively, in a superposed relation to each other with one of the extensions 13 enfolded by the other extension 14. These superpose extensions 13 and 14 each have a multiplicity of small gatherings that are made up of a multiplicity of land and valley portions 10a and 10b alternating in the longitudinal direction of the crimped joint section 10 and hence of the elongate member 1. Other structural features of the modified closed-sectional curved elongate member 1 and material used in the modification are the same as in the first embodiment of FIG. 1 and are shown in the figures by the same reference numerals as in FIG. 1, but will not be described here to avoid unnecessary duplication.

Apparatus for fabricating the modified closed-sectional curved elongate member 1 can be readily constructed by only replacing the crimping-roll unit 25 of FIGS. 2 and 3 with a gathering unit 60 as will be described below. Further, the modified closed-sectional curved elongate member 1 may be fabricated using the same step sequence as described earlier in relation to FIG. 5.

Figure 15:
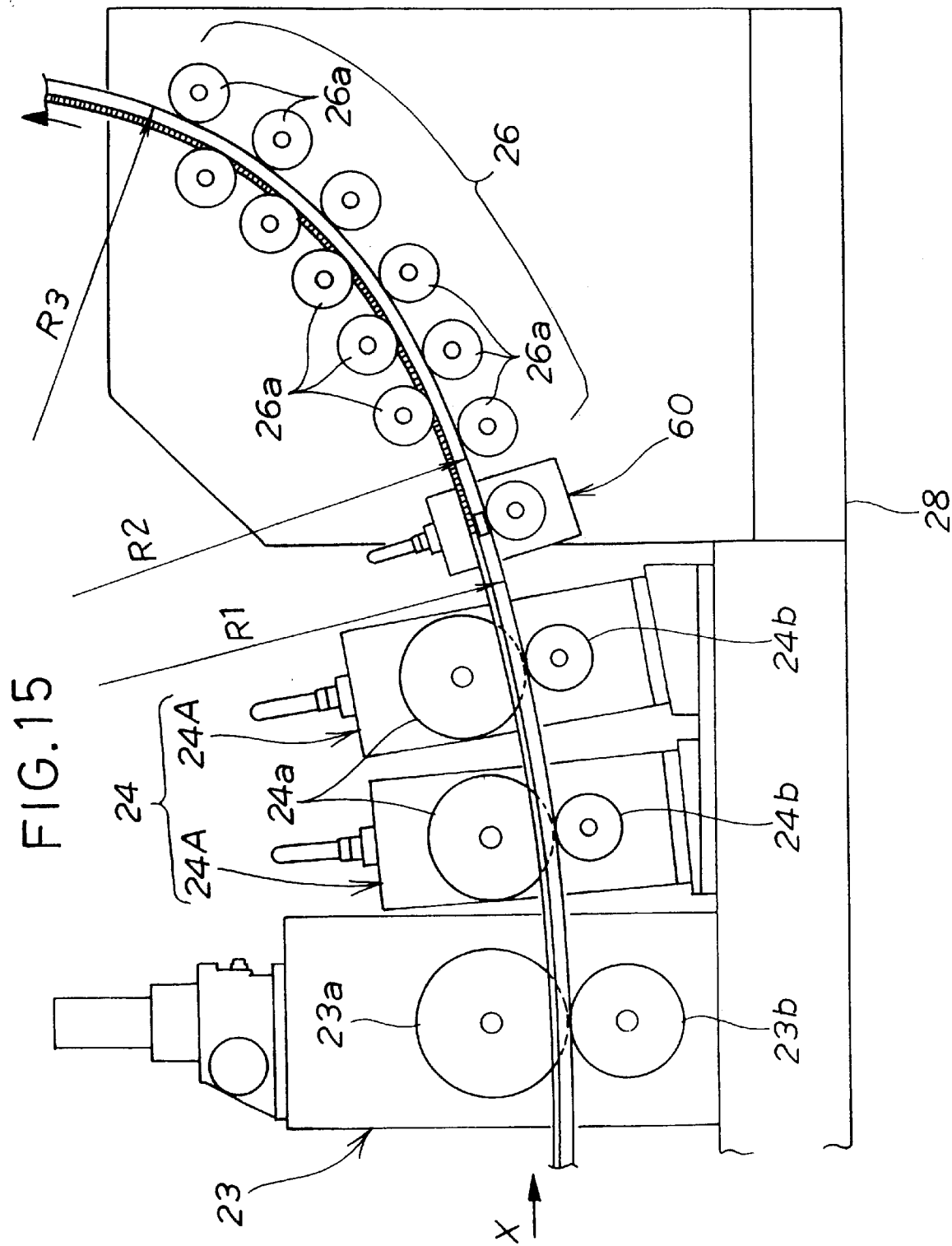
FIG. 15 is an enlarged fragmentary view of an apparatus for fabricating the modified closed-sectional curved elongate member shown in FIG. 14.
Figure 16A:
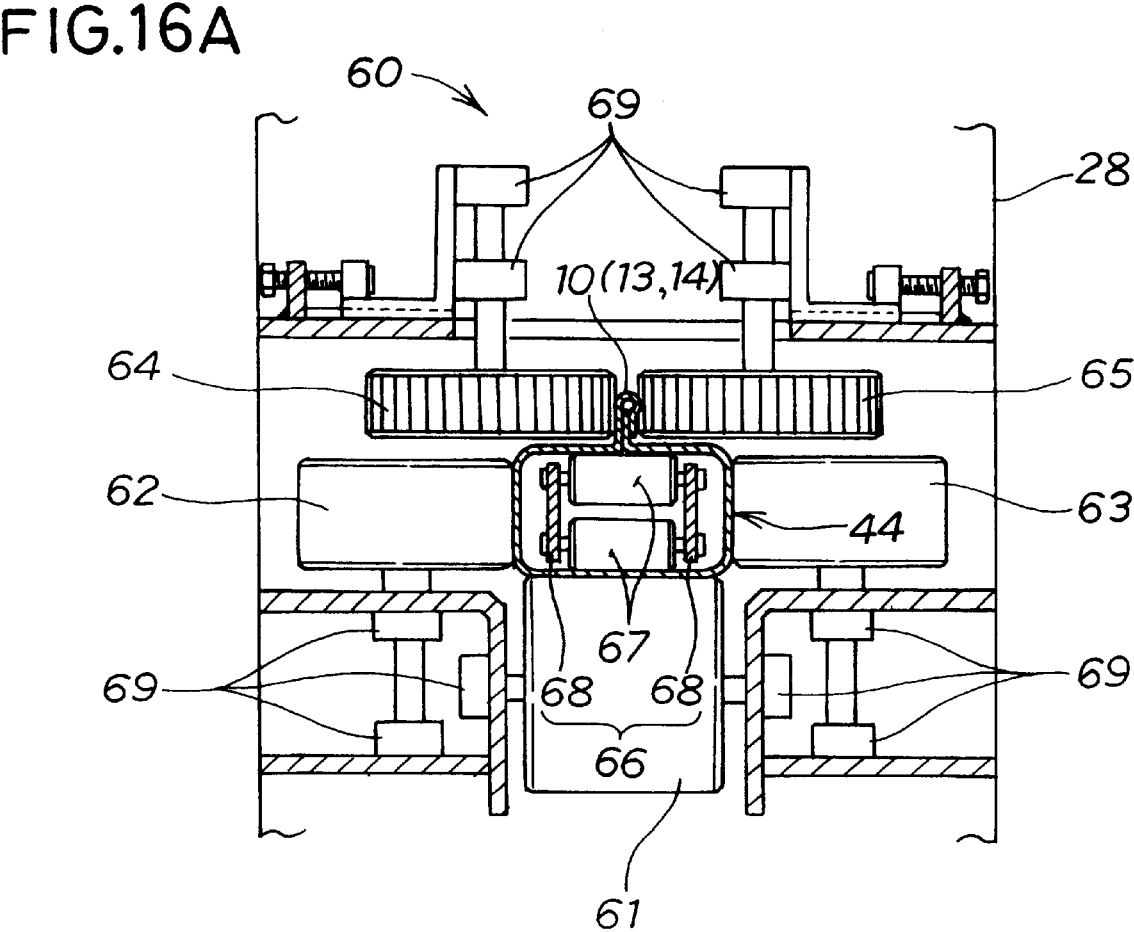
FIG. 16A is a fragmentary enlarged view, in section, of a gathering unit employed in the apparatus of FIG. 15.
Figure 16B:
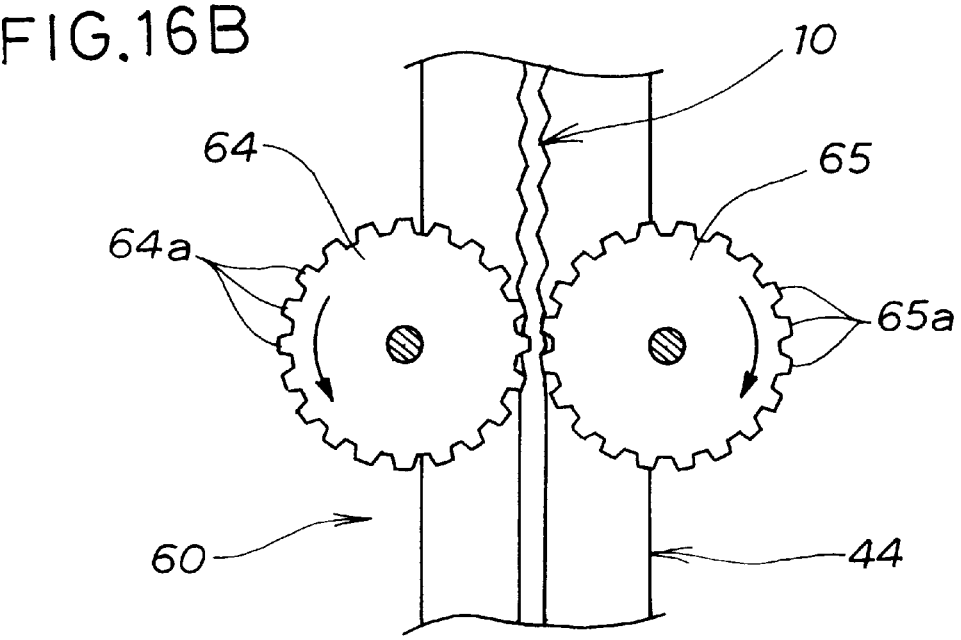
FIG. 16B is a plan view schematically showing a pair of gathering rollers of the gathering unit.

The following paragraphs describe the gathering unit 60 for forming the gatherings in the crimped joint section 10 of the modified closed-sectional curved elongate member 1, with reference to FIGS. 15, 16A and 16B. As shown in FIG. 15, the gathering unit 60 is provided in between the rear-stage roll-bending unit 24 and the roll-curving unit 26.

In FIG. 16A, the gathering unit 60 includes a lower roller 61 for supporting the underside of the elongate member 44, left and right rollers 62 and 63 for supporting the left and right side surfaces of the elongate member 44, a pair of left and right gathering rollers 64 and 65 located above the elongate member 44 for crimping the extensions 13 and 14 extending outwardly from the opposite longitudinal edge portions of the elongate member 44, and an auxiliary roller mechanism 66 for preventing the elongate member 44 from collapsing vertically when the extensions 13 and 14 are being crimped together.

As seen in a top plan of FIG. 16B, the gathering rollers 64 and 65 each have a multiplicity of teeth 64a or 65a formed in the outer peripheral surface thereof with a predetermined pitch. The auxiliary roller mechanism 66 includes a pair of upper and lower auxiliary rollers 67 and a pair of links 68 for rotatably supporting the auxiliary rollers 67 in place. Further, the auxiliary roller mechanism 66 is connected to a supporting rod (not shown) that was previously inserted in the elongate member 44 through an opening of the elongate member 44. Bearings 69 in FIG. 16A rotatably support the respective shafts of the lower roller 61, left and right rollers 62 and 65 and gathering rollers 64 and 65.

Figure 17A:
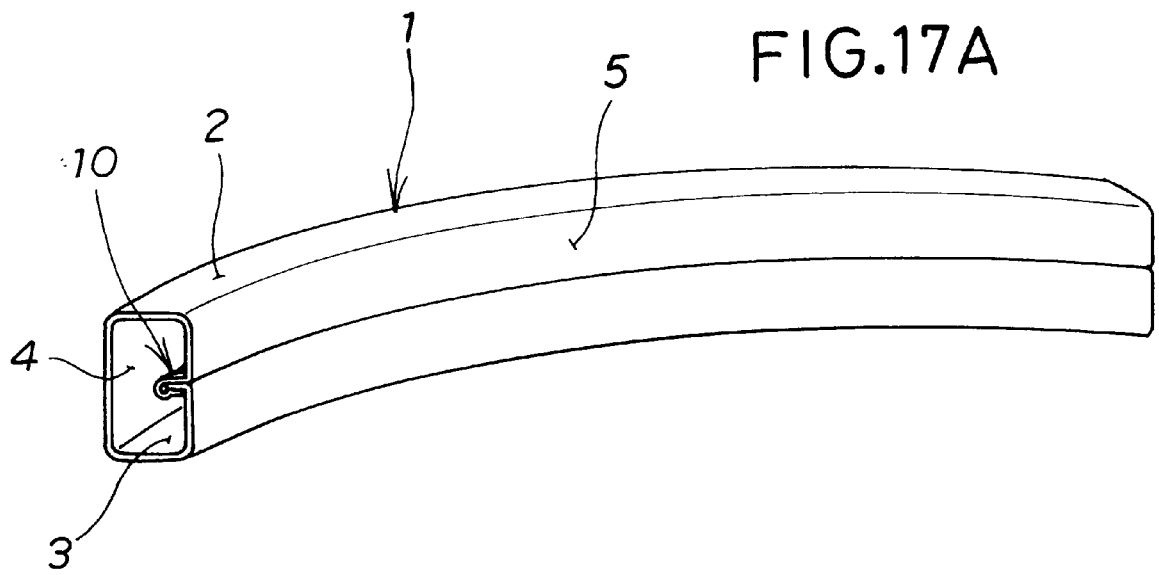
FIG. 17A is a perspective view showing a general configuration of a modification of the closed-sectional curved elongate member shown in FIG. 6.
Figure 17B:
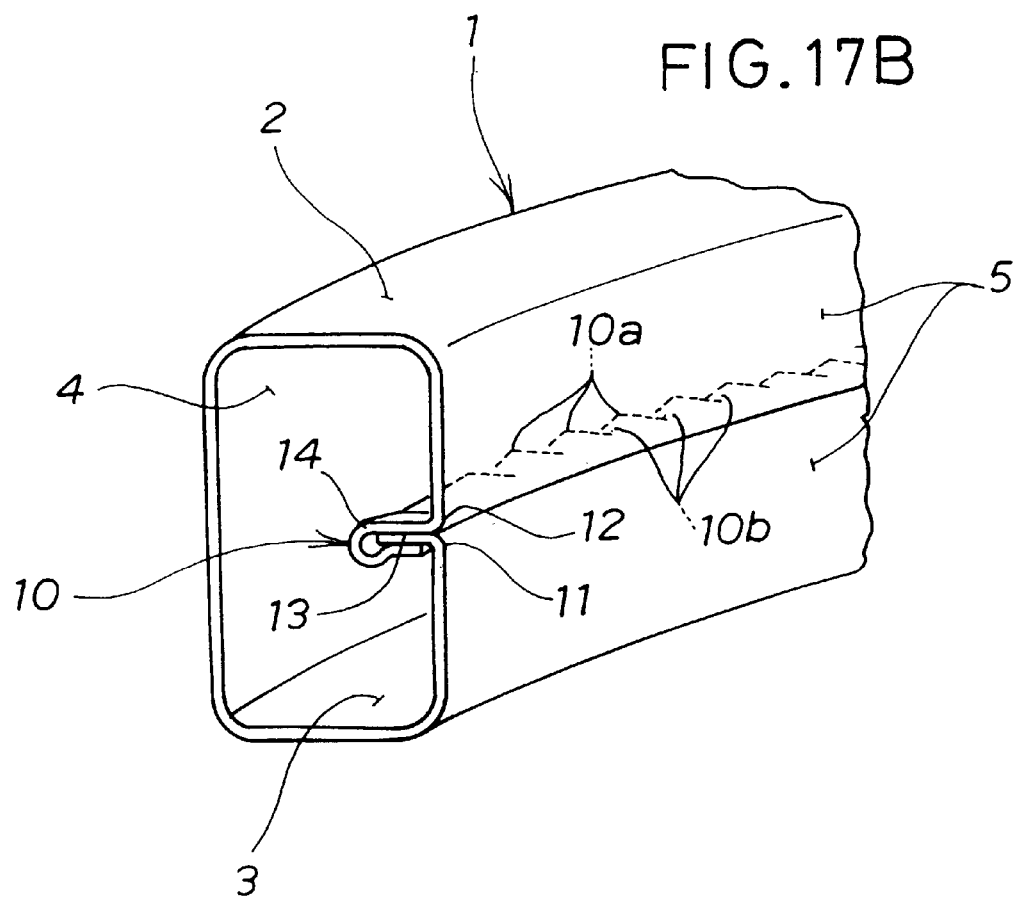
FIG. 17B is a fragmentary enlarged view of the modified closed-sectional curved elongate member of FIG. 17A where gatherings are formed in the crimped joint section.

FIGS. 17A and 17B are perspective views schematically showing a modification of the closed-sectional curved elongate member 1 according to the second embodiment of FIGS. 6A and 6B, where the crimped joint section 10 is provided on an inner wall surface of the elongate member 1. This modified closed-sectional curved elongate member 1 is also characterized in that the crimped joint section 10 has gatherings. Namely, in the crimped joint section 10, the extensions 13 and 14 protrude inwardly from the butting longitudinal edge portions 11 and 12, respectively, in a superposed relation to each other with one of the extensions 13 enfolded by the other extension 14. These superpose extensions 13 and 14 are crimped together such that a multiplicity of small gatherings, made up of a multiplicity of land and valley portions 10a and 10b alternating in the longitudinal direction of the crimped joint section 10 and hence of the elongate member 1, are formed in each of the extensions 13 and 14. Other structural features of the modified closed-sectional curved elongate member 1 and material used in the modification are the same as in the first embodiment of FIG. 1 and are shown in the figures by the same reference numerals as in FIG. 1, but will not be described here to avoid unnecessary duplication.

Apparatus for fabricating the modified closed-sectional curved elongate member 1 of FIGS. 17A and 17B can be readily constructed by only replacing the crimping-roll unit 25 of FIGS. 2 and 3 with a gathering unit 70 as will be described below. Further, the modified closed-sectional curved elongate member 1 of FIGS. 17A and 17B may be fabricated using the same step sequence as described earlier in relation to FIG. 5.

Figure 18:
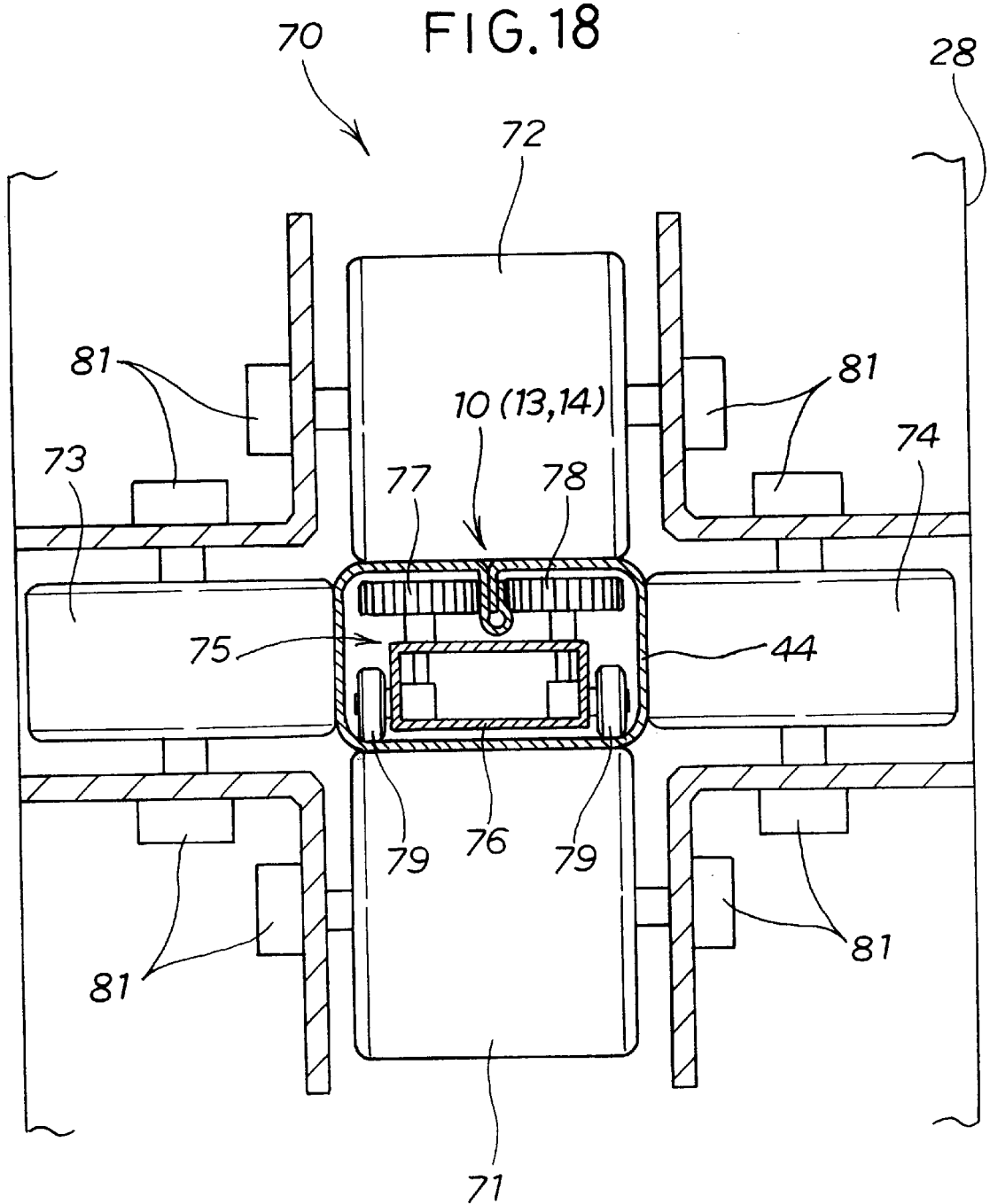
FIG. 18 is a sectional view schematically showing a gathering unit used to fabricate the modified closed-sectional curved elongate member of FIG. 17.

The following paragraphs describe the gathering unit 70 for forming the gatherings in the crimped joint section 10 of the modified closed-sectional curved elongate member 1, with reference to FIG. 18. As shown in FIG. 18, the gathering unit 70 includes a lower roller 71 for supporting the underside of the elongate member 44, an upper roller 72 for engaging the upside of the elongate member 44, left and right rollers 73 and 74 for supporting the left and right side surfaces of the elongate member 44, a crimping mechanism 75 for crimping together the extensions 13 and 14 inside the hollow section of the elongate member 44 while forming the gatherings therein.

This crimping mechanism 75 also includes a base 76, a pair of left and right gathering rollers 77 and 78 for crimping together the extensions 13 and 14 while forming the gatherings therein, and a pair of left and right wheels 79 rotatably mounted on opposed sides of the base 76. The crimping mechanism 75 is connected to a supporting rod (not shown) that was previously inserted in the elongate member 44 through an opening of the elongate member 44.

The left and right gathering rollers 77 and 78 employed in the gathering unit 70 are constructed similarly to the gathering rollers 64 and 65 shown in FIG. 16. Specifically, these gathering rollers 77 and 78 each have a multiplicity of teeth formed in the outer peripheral surface thereof with a predetermined pitch so that the extensions 13 and 14 are firmly pressed between the toothed gathering rollers 77 and 78 and joined together in a crimped fashion. Bearings 81 in FIG. 18 rotatably support the respective shafts of the lower roller 71, upper roller 72 and left and right rollers 73 and 74.

In summary, the closed-sectional curved elongate member 1, having been described above in connection with the various embodiments and modifications of the present invention, can afford various superior benefits in the case where it is applied as a bumper beam of an automotive vehicle, such as an enhanced impact-energy absorbing capability and a minimized transmission of the impact energy to the vehicle body, especially when the crimped joint section is positioned on the upper or lower wall surface of the bumper beam.

Whereas the closed-sectional curved elongate member of the present invention has been described as having a rectangular sectional shape, the present invention is not so limited; for example, the closed-sectional curved elongate member may have a triangular sectional shape. Further, although the closed-sectional curved elongate member of the present invention has been described as being curved along its entire length, it may be curved only in part of the length.

Furthermore, the steps of curving the elongate member may be initiated during or substantially concurrently with the crimping step.

Obviously, various minor changes and modifications of the present invention are possible in the light of the above teaching. It is therefore to be understood that within the scope of the appended claims, the invention may be practiced otherwise than as specifically described.

What is claimed is:

1. A closed-sectional curved elongate member which includes a crimped joint section that is formed on any one of a plurality of wall surfaces of said elongate member defining a closed section of said elongate member, said crimped joint section extending along a length of said elongate member, and which is curved along a longitudinal direction thereof, where said crimped joint section has gatherings.

2. An elongate member comprising from a strip a hollow closed section and a crimped joint section, said hollow closed section having a plurality of walls with opposite longitudinal edge portions substantially butting against one another and with two extensions of the opposite longitudinal edge portions protruding away from one of said walls thereby providing rigidity to said hollow closed section, said crimped joint section being formed by crimping said two extensions together, said elongate member being curved in a longitudinal direction.

3. The elongate member as claimed in claim 2 where said crimped joint is formed inside the closed section.

4. The elongate member as claimed in claim 2 wherein said crimped joint section has gatherings.

* * * * *